United States Patent
Ramachandran et al.

(10) Patent No.: US 11,086,932 B1
(45) Date of Patent: Aug. 10, 2021

(54) ASSET-LEVEL MANAGEMENT OF MEDIA RECORDING IN CLOUD DVR SYSTEMS

(71) Applicant: Amazon Technologies, Inc., Seattle, WA (US)

(72) Inventors: Akhil Ramachandran, Hillsboro, OR (US); Meera Jindal, Portland, OR (US); Benjamin Aldouby Schwartz, Baltimore, MD (US); Ahmet Gurcan, Portland, WA (US); Ryan Farris, Bellevue, WA (US); Abilash Ravikumar, Portland, WA (US); Saurav Sengupta, Beaverton, OR (US); Michael Kale, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/823,198

(22) Filed: Mar. 18, 2020

(51) Int. Cl.
| | | |
|---|---|---|
| *G06F 16/71* | (2019.01) | |
| *G06F 16/75* | (2019.01) | |
| *H04N 21/218* | (2011.01) | |
| *H04N 21/278* | (2011.01) | |
| *H04N 21/2747* | (2011.01) | |

(52) U.S. Cl.
CPC .......... *G06F 16/71* (2019.01); *G06F 16/75* (2019.01); *H04N 21/2181* (2013.01); *H04N 21/278* (2013.01); *H04N 21/2747* (2013.01)

(58) Field of Classification Search
CPC ..... G06F 16/71; G06F 16/75; H04N 21/2181; H04N 21/2747; H04N 21/278
See application file for complete search history.

(56) References Cited

U.S. PATENT DOCUMENTS

| | | | |
|---|---|---|---|
| 8,074,262 | B2 | 12/2011 | Scarlata |
| 8,249,257 | B2 | 8/2012 | Brutch et al. |
| 8,259,948 | B2 | 9/2012 | Smith et al. |
| 8,261,054 | B2 | 9/2012 | Smith |
| 8,356,347 | B2 | 1/2013 | Berger et al. |
| 8,453,236 | B2 | 5/2013 | Seifert et al. |
| 8,549,288 | B2 | 10/2013 | Bade et al. |
| 10,002,247 | B2 | 6/2018 | Suarez et al. |
| 10,353,726 | B2 | 7/2019 | Duan |
| 10,586,042 | B2 | 3/2020 | Stopel et al. |
| 10,592,678 | B1 | 3/2020 | Ismael et al. |

(Continued)

OTHER PUBLICATIONS

U.S. Appl. No. 17/020,634, filed Sep. 14, 2020, Samartha Chandrashekar et al.

(Continued)

*Primary Examiner* — James R Marandi
(74) *Attorney, Agent, or Firm* — Robert C. Kowert; Kowert, Hood, Munyon, Rankin & Goetzel, P.C.

(57) ABSTRACT

A media storage service may maintain an asset including information to indicate a specific media content and a specific number of replicas to be stored by the media storage service for the specific media content. The media storage service may receive content recording-related requests from a recording manager to define or update the specific number for the specific media content. The media storage service may receive one or more segments specific to the media content from an encoder. The media storage service may create and store the specific number of replicas, as indicated in the asset, for the media content.

20 Claims, 7 Drawing Sheets

(56) References Cited

U.S. PATENT DOCUMENTS

| | | |
|---|---|---|
| 2008/0178176 A1 | 7/2008 | Berger et al. |
| 2014/0006776 A1 | 1/2014 | Scott-Nash et al. |
| 2018/0124445 A1* | 5/2018 | Beili ................ H04N 21/84 |

OTHER PUBLICATIONS

Arun Gupta, et al., "Announcing the Firecracker Open Source Technology: Secure and Fast microVM for Serverless Computing", AWS Open Source Blog, Nov. 27, 2018, Source https://aws.amazon.com/blogs/opensource/firecracker-open-source-secure-fast-microvm-serverless/, pp. 1-11.

AWS, "Amazon ECS User Guide for AWS Fargate" API Version Nov. 13, 2013, Revised Jul. 9, 2020, pp. 1-374.

U.S. Appl. No. 17/020,642, filed Sep. 14, 2020, Samartha Chandranshekar.

Cisco Cloud Object Storage Release 3.8.1 API Guide. "Chapter 7—Fanout API". Available Jul. 13, 2020 at https://www.cisco.com/c/en/us/td/docs/video/virtualized_video_processing/cloud_object_storage/3-12-1/api-guide/cos-3-12-1-api-guide/fanout-api.pdf, pp. 1-10.

* cited by examiner

ASSET-LEVEL MANAGEMENT OF MEDIA RECORDING IN CLOUD DVR SYSTEMS

BACKGROUND

Cloud Digital Video Recorder (DVR) allows media contents (e.g., TV programs, movies, audio or video streaming, etc.) to be recorded and saved for subscribers to play at the subscribers' convenience. Compared to traditional DVRs, cloud DVR saves the media recordings in network-based storage resources (e.g., a cloud) rather than local storage devices, thus providing more cost-efficient storage and better resilience. Certain regulatory policies require to maintain separate replicas of the same media content for different subscribers, one replica specific to one subscriber. Generally, a content provider encodes a media content during broadcast of the media content, e.g., using an encoder, and uploads the encoded segments to the storage resource such as the cloud. Although encoders generate the content segments, it falls out of the responsibility of typical encoders to track how many replicas need to be created for a specific media content. Rather, a recording manager is further employed to function as the interface with subscribers to determine the number of replicas to be created and stored for the specific media content. Moreover, when a subscriber requests for a recording during the broadcast of the media content, the encoder will only have access to the media content starting from the point where the request is received, thus missing the earlier portion of the media content in the resultant recording. Thus, it is desirable to have techniques to orchestrate actions of the recording manager and encoder to streamline media recording in cloud DVR systems.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Cloud DVR allows media contents (e.g., TV programs, sports, movies, audio or video streaming, etc.) to be recorded and saved in network-based storage resources (e.g., a cloud). A cloud DVR system may include three major components—(1) recording manager(s), (2) encoder(s), and (3) storage resource(s) such as a cloud. A recording manager may function as an interface with subscribers. The recording manager may receive recording requests from the subscribers, which may indicate a specific media content to be recorded requested by a specific subscriber. The recording requests may be received by the recording manager before broadcast of the media content. For instance, a subscriber may schedule a recording before the media content is actually broadcasted. The recording requests may also be received during broadcast of the media content. For instance, at halfway of a broadcast, a subscriber may suddenly request recording of the media content. Regardless of whether the requests are received before or during the broadcast, certain regulatory policies require maintaining separate replicas of the same media content for separate subscribers—one replica specific to one subscriber. This essentially provides one specific replica as the "private copy" for one specific subscriber.

When the recording manager receives the recording requests, the recording manager may determine how number of replicas to be created for what media content. The recording manager may communicate the content information to the content provider, which may produce a recording of the specific media content, e.g., using the encoder. The encoder may encode the media content once it is being broadcasted, generate encoded segments (or chunks) of the media content, and upload the segments to the storage resource such as the cloud. Generally, the encoder may not have to track how many replicas need to be created for the specific media content. Rather, that information is maintained by the recording manager. When the number of replicas is available to the recording manager before the broadcast, the recording manager may send the number to the cloud. The cloud may further create the required number of replicas of the media content based on the uploaded segments. However, when the recording manager receives a recording request during broadcast of the media content, the recording manager may inform the content provider, which may then, from that point, cause the encoder to start encoding the media content. Because the media content is already in broadcast, the resultant recording produced by the encoder may lose segments of the early portion of the media content that has already been broadcasted.

Various techniques to manage media recordings in cloud DVR systems are described in this disclosure. The techniques may use a media storage service as an interface to orchestrate actions of recording manager(s) and encoder(s) to streamline media recording in cloud DVR systems. In some embodiments, the media storage service may include a replicas manager to implement various media recording management tasks. In some embodiments, through the replicas manager, the media storage service may receive requests, e.g., from a recording manager, to create assets for media contents. An asset may include information specifying various attributes of a specific media content. The specified attributes may include, for instance, storage paths of the uploaded segments for the specific media content, timing information (e.g., start and stop times) of the content, data associated with electronic program guide (EPG), data associated with the manifest file specific to the media content, metadata of the segments of the media content, etc. The replicas manager may use the asset as a high-level abstraction to specify what media contents to store, how to reference a specific media content, and how many replicas to make. In some embodiments, when the media storage service receives uploads of segments from the encoder, the replicas manager may identify segments from the received uploads as segments of the specific media content based on the asset associated with the specific media content. For instance, the asset may specify a path to store uploaded segments for a specific media content on the storage resources in the media storage service. Thus, when the uploads from the encoder request the media storage service to store the uploaded segments to a path that matches the path specified in the asset, the replicas manager may thus determine that the uploaded segments are for the specific media content. In some embodiments, the asset may further specify a specific number of replicas to be created and stored for a media content in the media storage service. For instance, the replicas manager may receive the specific number related information from the recording manager before broadcast of the content. The replicas manager may log the information in the asset for the specific content. Once the replicas manager starts to receive segment(s) from encoders specific to the media content, the replicas manager may create the specific number of replicas based on the received segments and store them on the storage resources of the media storage system. In some embodiments, the recording manager may receive recording requests from subscribers during broadcast which would require for an update of the specific number of replicas. For instance, a subscriber may require a new recording of a media content at halfway of the broadcast. The recording manager may send a request to the media storage service, e.g., through the replicas manager, to update the specific number of replicas for the specific media content. The replicas manager may categorize the asset associated with the specific media content, update the specific number in the asset, and update existing replicas of the specific media content based on the updated specific number. In this example, the update is to create an additional copy of the replica for an entire or partial portion of the media content, as the private copy for the subscriber. Compared to traditional approaches, the disclosed techniques simplify the media recording coordination between the recording manger(s), encoder(s) and media storage service. For instance, the disclosed techniques do not require encoders to track how many replicas need to be created. Rather, the encoders may focus on processing source contents (once it is broadcasted) to generate segments for the media storage service. That means that the content provider may not have to use special encoders and instead can continuously use existing ones. The recording manager may still function as the interface with subscribers. For example, the recording manager may determine the number of replicas required for a specific content and communicate the information to the media storage service. It is the media storage service that may be tasked to manage the appropriate number of replicas for specific media contents before and during broadcast. Moreover, since the media storage service has access to all the uploaded segments specific to the media content, it may create replicas of the entire content even for recording amid a broadcast.

Figure 1:
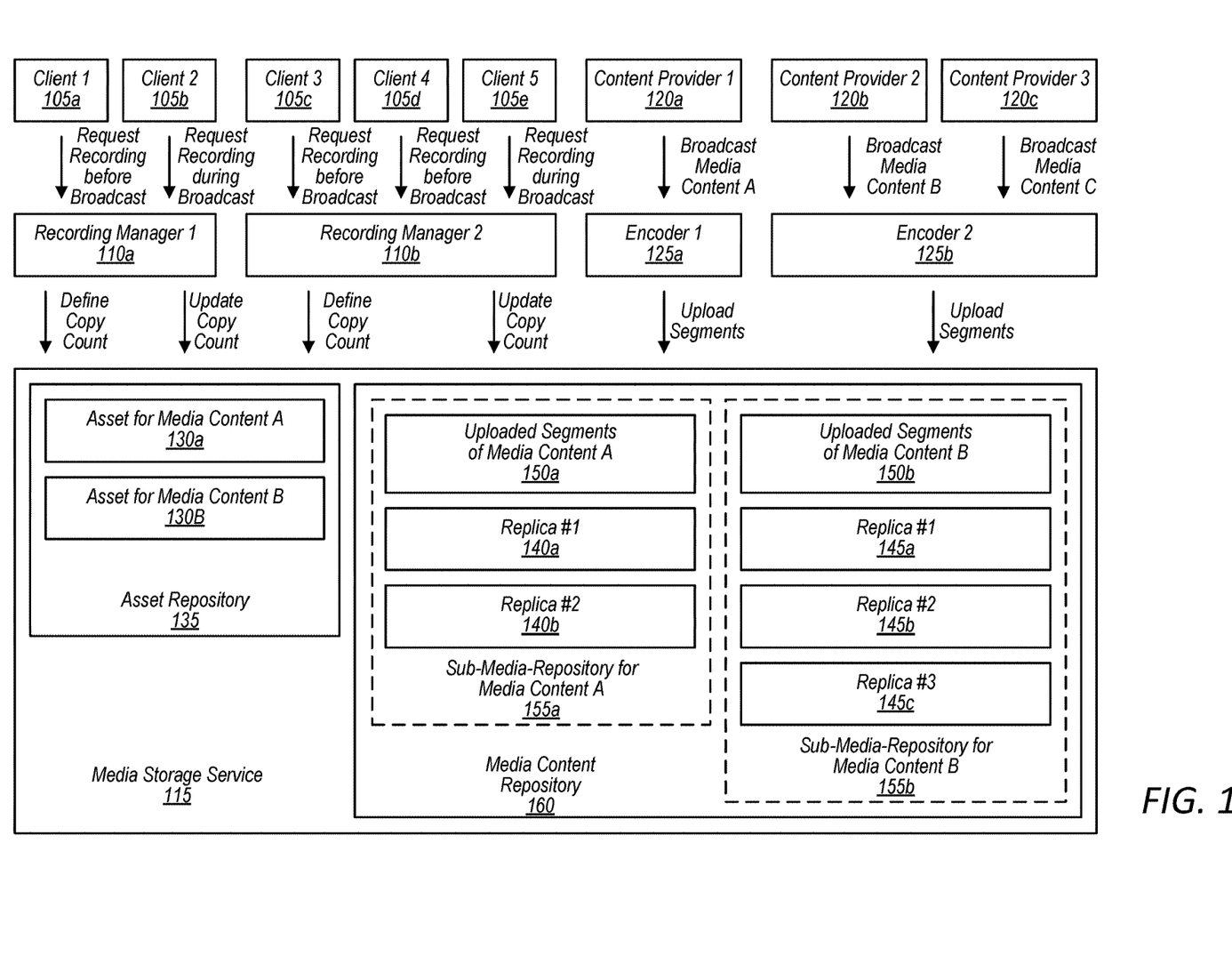
FIG. 1 is a block diagram showing an example media storage service, according to some embodiments.

FIG. 1 shows an example media storage service, according to some embodiments. FIG. 1 depicts recording managers 110a-110b, encoders 125a-125b, and media storage service 115. Recording manager 110a-110b may broadly include various computing devices, applications, or a combination of hardware and software that may interface with and receive recording requests from subscribers. For instance, recording managers 110a-110b may include set-top boxes, streaming devices, smart TV, smart phones, tablets, computers, etc. Each recording manager 110a-110b may interface with one or more clients. For instance, recording manager 110a may receive recording commands from clients 105a-105b, and recording manager 110b may communicate with clients 105c-105e. Here, the term "client" may broadly refer to media content playing devices or applications that may be used by a subscriber to perform various DVR-related operations, such as recording, playback, viewing, deleting, etc. Clients 105a-105e may respectively request recording of respective media contents before or after broadcast of the respective media contents. For instance, clients 105a may request recording of media content A before the broadcast of media content A, and 105c-105d may schedule recording of media content B prior to the broadcast of media content B. Those recording requests may be received by recording managers 110a-110b, respectively. In this example, recording manager 110a may determine that there needs 1 copy of media content A to be created for client 105a, while recording manager 110b may determine 2 copies for media content B for clients 105c-105d. Recording managers 110a-10b may submit the information to media storage service 115, e.g., through various wired and/or wireless communication networks, to request for creation of assets for media contents A and B. In response to the requests, media storage service 115 may create assets 130a-130b in asset repository 135 for media contents A and B, respectively. Assets 130a-130b may be in various forms of data items, e.g., tables, XML documents, JSON files, and so on. Each asset 130a-130b may include information specifying various attributes associated with respective media contents A and B. For instance, asset 130a may include information specifying a path to store uploaded segments of media content A on the one or more storage resources in media storage service 115. In some embodiments, the path may be defined by recording manager 110a, encoder 125a, or media storage service 115, depending on an agreement between the components in initial configurations. In some embodiments, asset 130a may include data associated with an EPG, manifest file or metadata specific to media content A. In some embodiments, asset 130a may also store the specific number of replicas required for media content A, which is determined and provided by recording manager 110a. In this example, at this moment, the specific number of replicas in asset 130a for media content A may be 1, because recording manager 110a receives only one recording request from client 105a. In some embodiments, the information in assets 130a-130b may be continuously updated during the broadcast of the media contents.

In some embodiments, content providers 120a-120c may each include one or more media content libraries, and use encoders such as 125a-125b to produce segments of the source contents for storage in media storage service 115. Encoders 125a-125b may include various computing devices, applications, or a combination of the two. Encoders 125a-125b may receive media contents from respective content providers 120a-120c, e.g., beginning from broadcast of the media contents. Encoder 125a-125b may convert the upstream source content from one format and package into downstream destination contents in other formats and packages for playback on various devices. For instance, encoder 125a may encode media content A broadcasted by content provider 120a and create segments of media content A in HLS, RTMP, RTSP, MPEG-DASH, CMAF, or other types of formats and packages. One segment may be an audiovisual file containing one chunk of the source content. For instance, one segment may last 10 seconds, and encoder 125a may thus create 6 segments for 60-second media content A. Similarly, encoder 125b may create segments for media content B broadcasted by content provider 120b.

In some embodiments, encoders 125a-125b may upload segments of media contents A and B, the media contents that are requested for recording, to media storage service 115 through various wired and/or wireless communication channels. Media storage service 115 may receive and store uploaded segments for media contents A and B, e.g., 150a-150b, on one or more storage resources implemented as part of media storage service 115. In some embodiments, encoders 125a-125b may upload respective segments one-by-one (e.g., whenever a segment is produced and becomes available for upload) or in batch. Further, the segments of media content A may be uploaded by encoder 125a, in parallel to the uploads of the segments of media content B from encoder 125b. When media storage service 115 receives a plurality of segments from encoders 125a-125b, media storage service 115 may identify what segments are specific to respective media contents A and B based on information in the assets 130a-130b. For instance, media storage service 115 may base on the information in asset 130a (that is associated with media content A) to categorize the segments specific to media content A from the uploaded plurality of segments. Similarly, media storage service 115 may determine the segments specific to media content B based on asset 130b that is associated with media content B. The identification may be performed in various ways. For instance, when uploading segments, encoder 125a be may specify a path to store the uploaded segments for media contents A. Media storage service 115 may inspect the given path to determine whether it matches the path specified in asset 130a. When there is a match, media storage service 115 may accordingly determine that the uploaded segments are for the specific content A. In some embodiments, encoder 125a may also generate a manifest file along with the segments for media content A. The manifest file may include content-related information such as content type (e.g., audio, video, or text), content name, content language, start time, end time, bitrate, codec type, etc. Encoder 125a may upload the manifest file and the segments altogether to media storage service 115. Media storage service 115 may scan the manifest file versus information specified in asset 130a. For instance, media storage service 115 may check whether the content name in the manifest file indicates a same content specified in asset 130a. When there is a match, media storage service 115 may determine that the uploaded segments are specific to media content A. In some embodiments, asset 130a may include data associated with an electronic program guide (EPG). The data may indicate program schedules on certain broadcast channels, for example, media content A is scheduled to be broadcasted on channel 72 by content provider 120a at 10:30 a.m. every Wednesday. Thus, when media storage service 115 receives uploaded segments from encoder 125 (associated with content provider 120a) at or near 10:30 a.m. on Wednesday, media storage service 115 may identify the uploaded segments as segments specific to media content A. In some embodiments, encoder 125a-125b may generate metadata describing the content segments. Example metadata may include files names and/or tags that describe the media contents or segments. The metadata may be uploaded together with the segments to media storage service 115. In response, media storage service 115 may inspect the metadata and, based on the respective assets, determine whether the uploaded segments belong to a specific media content. Media storage service 115 may update the information in assets 130a-130b to record the paths or storage locations once uploaded segments 150a-150b specific to media contents A and B are stored on the storage resources.

In some embodiments, assets 130a-130b may include information specifying a specific number of replicas to be created for respective media contents A and B. Once media storage service 115 receives uploaded segments for media contents A and B from encoders 125a-125b, media storage service 115 may use the uploaded segments as "templates" to create the specific number of replicas. In this example, asset 130a may specify 1 replica to be created and stored for media content A and asset 130b specify 2 replicas for media content B. Thus, media storage service 115 may create and store 1 replica of media content A (e.g., 140a) based on uploaded segments 150a, and 2 replicas of media content B (e.g., 145a-145b) based on uploaded segments 150b. Replica 140a and uploaded segments 150a may essentially form sub-media-repository 155a for media content A, while replicas 145a-145b and segments 150b establish sub-media-repository 155b for media content B, both of which may be stored in media content repository 160. In some embodiments, sub-media-repository 155a-155b and media content repository 160 may each include one or more containers on the storage resources in media storage service 115. In some embodiments, media storage service 115 may update the information in assets 130a-130b to record the paths or storage locations of existing replicas 140a-140b and 145a-145b specific to respective media contents A and B on the storage resources.

In some embodiments, recording managers 110a-110b may receive updated recording requests during. For instance, client 105b and 105e may respectively request recording of media contents A and B during broadcast. The updated recording requests may be received by recording managers 110a-110b respectively, which may be further sent to media storage service 115. Media storage service 115 may update the specific number of replicas for media contents A and B in assets 130a-130b, respectively. In this example, media storage service 115 to update the specific number of replicas in asset 130a from 1 to 2 (because of the mid-broadcast recording request from client 105b) and the specific number in asset 130b from 2 to 3 (due to the recording request of client 105e). Media storage service 115 may further update the existing replicas for media contents A and B. For instance, media storage service 115 may create an additional replica 140b of media content A for client 105b based on uploaded segments 150a, and an additional replica 145c of media content B for client 105d based on uploaded segments 150b. In some embodiments, depending on service agreements between a subscriber and content provider, the subscriber may not be allowed to record the entire content if the recording is demanded amid broadcast. In that case, when media storage service 115 receives the update request from the recording manager, e.g., 110a, media storage service 115 may determine whether the subscriber, e.g., client 105b, has allowance to still recording the entire content. When client 105b has the permission, media storage service 115 may create the additional replica 140b for client 105b to include replicas of all the uploaded segments 150a. Conversely, when client 105b is only allowed to record media content A from the point where client 105 requests the mid-broadcast recording (hereinafter "allowance point"), additional replica 140b may include only replicas of those from uploaded segments 150a which correspond to the partial portion of medic content A from the allowance point. In some embodiments, asset 130a may include timing information, e.g., a start time and/or a stop time, of media content A. Media storage service 115 may identify the segments behind the allowance point based on the timing information in asset 130a. In some embodiments, media storage service 115 may retrieve segments from uploaded segment 150a within a time window (e.g., 10 seconds) prior to the allowance point, and include also replicas of the retrieved segments (within the time window) in additional replica 140b for client 105b.

Besides requests to create new recordings, recording managers 110a-110b may also receive updated recording request from clients 105a-105e to delete recording(s) before, during or after the broadcast. Similar to above described actions, recording managers 110a-110b may submit the updated recording requests to media storage service 115. Media storage service 115 may update the specific number of replicas in assets 130a-130b for the specific contents A or B based on the updated recording requests, identify existing replica(s) for the specific contents, and delete existing replica(s) of the specific contents based on the specific number in the assets.

Figure 2:
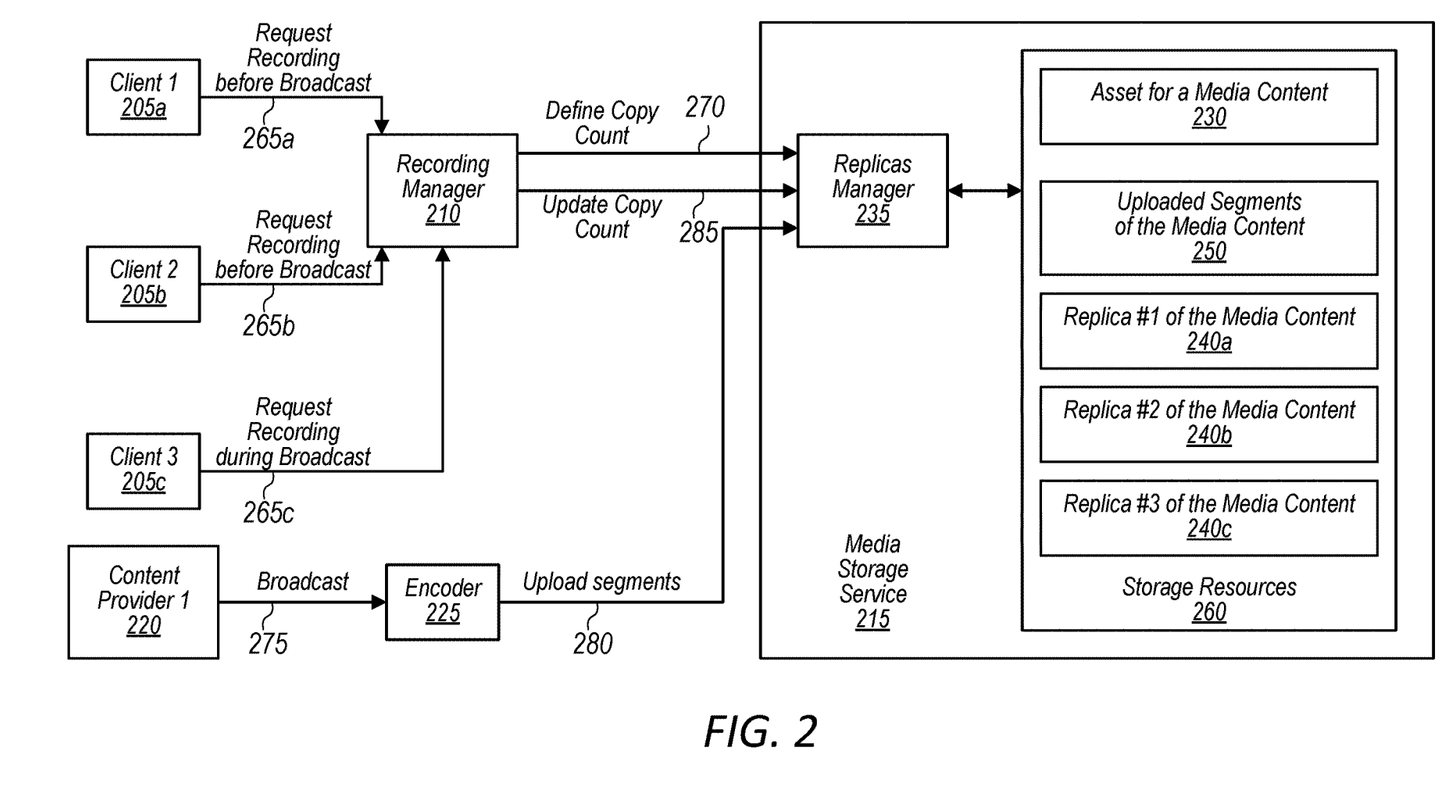
FIG. 2 is a block diagram showing example interactions between recording manager, encoder, and media storage service, according to some embodiments.

FIG. 2 shows example interactions between recording manager, encoder, and media storage service, according to some embodiments. In FIG. 2, recording manager 210 may receive recording requests from clients 205a-205b before broadcast of a media content (as indicated by 265a-265b). Recording manager 210 may provide the specific number of replica for the specific content to media storage service 215, e.g., received at replicas manager 235 (as indicated by 270). Replicas manager 235 may create asset 230 for the specific media content on one or more storage resources 260 of media storage service 215. For instance, the replicas manager may invoke an application programming interface (API) to cause media storage service 215 to create asset 230. Asset 230 may include information indicating the specific number of replicas for the specific media content. In this example, the specific number is 2 replicas respectively for clients 205a-205b. Content provider 220 may start broadcasting the media content, which may be transmitted as source content to encoder 225 (as indicated by 275). Encoder 225 may generate one or more destination content segments from the source content, and upload the segments to media storage service 115 through replicas manager 235 (as indicated by 280). Based on the information included in asset 230, replicas manager 235 may identify and store uploaded segments 250 specific to the specific content on storage resources 260. As described above, replicas manager 235 may associate asset 230 with uploaded segments 250 of the specific content in various ways, e.g., based on storage path, data associated with a manifest file or metadata, or data associated with an EPG. As media storage service 115 receives uploaded segments 250, media storage service 115 through replicas manager 235 may create the specific number of replicas for the specific media content. As asset 230 specifies 2 replicas, replicas manager 235 may use uploaded segments 250 as the template to create two replicas 240a-240b respectively for clients 205a-205b. In some embodiments, replicas manager 235 may receive the specific number from recording manager 210 before encoder 225 uploads the segments. Thus, replicas 240a-240b may be continuously created along with the continuous uploading of segments 240 for the specific content. Replicas manager 236 may continuously track the status of uploaded segments 250 and existing replicas 240a-240b on storage resources 260 and update the information in asset 230 accordingly. For instance, replicas manager 236 may store the storage paths of uploaded segments 250 and replicas 240a-240b, when received and/or created, so that replicas manager 235 may locate uploaded segments 250 and replicas 240a-2240b as needed based on the information in asset 230.

In some embodiments, recording manager 210 may continuously receive an updated recording request from client 205c during broadcast of the media content (as indicated by 265c). In response, recording manager 210 may send a request to media storage service 215 to update the copy count (as indicated by 285). The updated recording request may be received at replicas manager 235, which may in turn update the specific number of replicas for the specific content in asset 230. In this example, replicas manager 235 may update the specific number in asset 230 from 2 replicas to 3 replicas. As described above, client 205c may or may not have the permission to record the entire content for mid-broadcast recording demand. Thus, replicas manager 235 may further specify whether the newly requested replica includes the entire or only partial portion of the media content. As described above, when client 205c is allowed to record the entire content, replicas manager 235 may create additional replica 240c based on all uploaded segments 250 of the specific media content. In other words, additional replica 240c may include replicas of segments received before & after the allowance point. Conversely, when client 205c is only permitted to record the content from the allowance point, replicas manager 235 may create additional replica 240c based on only uploaded segments 250 that correspond to the portion of content after the allowance point. In some embodiments, the allowance point may be determined based on a time mark provided by recording manager 210. For instance, when recording manager 210 receives the mid-broadcast recording request from client 205c (as indicated by 265c), recording manager 210 may log the time when it receives the request. As described above, asset 230 may include timing information, e.g., a start time and/or an end time, of the media content. Thus, replicas manager 235 may identify the appropriate segments corresponding to the recording-allowable portion based on the time mark and the timing information in asset 230. In some embodiments, media storage service 215 may retrieve segments from uploaded segment 250 within a time window (e.g., 10 seconds) prior to the allowance point and include replicas of the retrieved segments (within the time window) in additional replica 240c for client 205c. For purposes of illustration, FIG. 2 only depicts example interactions for requesting for an additional recording during broadcast. In some embodiments, clients 205a-205c may requests further types of update to recordings of the media content. For instance, client 205a may request deleting a previously-created replica of the content. This updated recording request may be received by recording manager 210 and sent to replicas manager 235. Replicas manager 235 may update the specific number of replicas for the specific content in asset 230 and update existing replicas of the media content. For instance, replicas manager 235 may identify and delete existing replica 240a that is created and stored on storage resources 260 of media storage service 215 for client 205a.

Figure 3:
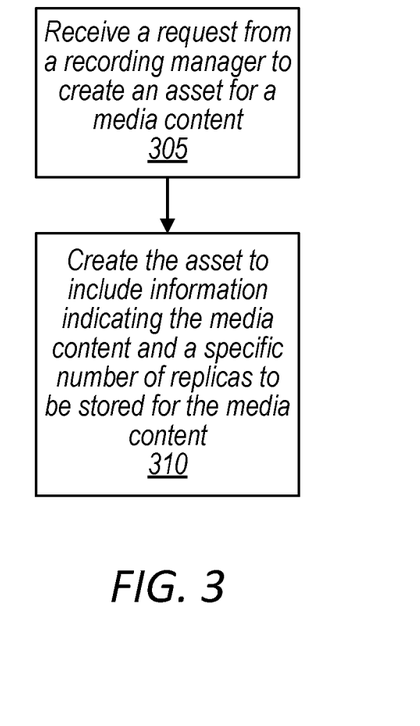
FIG. 3 is a block diagram showing an example of creating assets in a media storage service, according to some embodiments.

FIG. 3 shows an example of creating assets in a media storage service, according to some embodiments. In FIG. 3, the media storage service, such as media storage service 115/215 described above in FIGS. 1-2, may receive a request from a recording manager, such as recording managers 110/210 in FIGS. 1-2, to create an asset for a specific media content (block 305). In some embodiments, the request may further specify a specific number of replicas to be created for the specific media content. In response, the media storage service may create the asset on the storage resource of the media storage service (block 310). In some embodiments, the asset may include information specifying various attributes of the media content. As described above, the media storage service may use the specifications in the asset to decide what media contents to store, how to reference a specific media content, and how many replicas to make. For instance, the asset may include information indicating the specific media content, such as a path to store segments specific to the media content, timing information associated with the media content, data associated with an EPG, manifest file, and/or metadata for the specific media content. Further, the asset may further include information specifying the specific number of replicas to be created for the specific media content.

Figure 4:
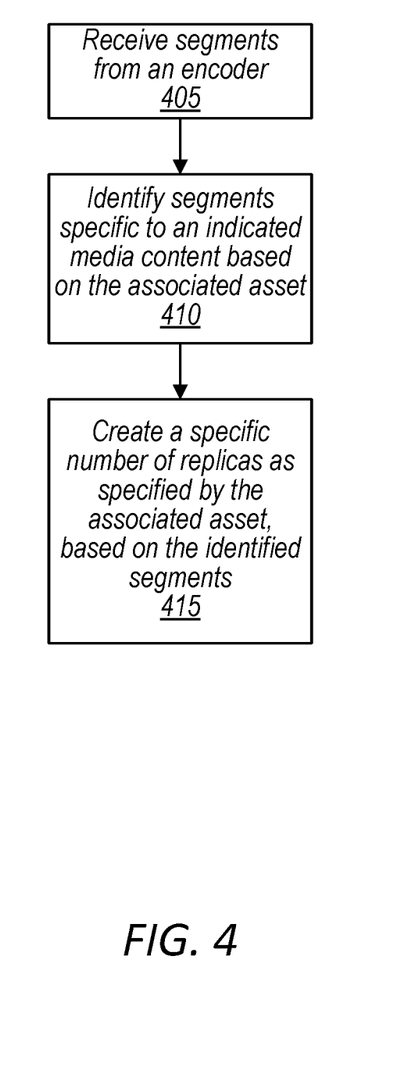
FIG. 4 is a block diagram showing an example of creating media content replicas in a media storage service, according to some embodiments.

FIG. 4 shows an example of creating media content replicas in a media storage service, according to some embodiments. In FIG. 4, the media storage service, such as media storage service 115/215 described above in FIGS. 1-2, may receive segments uploaded from an encoder, such as encoder 125/225 in FIGS. 1-2 (block 405). As described above, in some embodiments, the encoder may specify one or more paths to store respective uploaded segments. In some embodiments, the encoder may also upload a manifest file and/or metadata along with the uploaded segments to the media storage service. In response to receiving the segments, the media storage service may identify segments from the uploaded segments as segments specific to a media content (block 410). As described above, the media storage service may perform the identification based on information in an asset associated with the specific media content. In some embodiments, the media storage service may inspect the paths given by the encoder to determine whether the given paths match the path specified for the media content in the asset. When there is a match, the media storage service may automatically categorize the segments associated with the matched path as segments specific to the media content. In some embodiments, the media storage service may inspect the manifest file or metadata describing the content and uploaded segment based on the information included in the asset, and decide whether the segments belong to the specific media content. In some embodiments, the media storage service may assign uploaded segments as specific to the media content based on data in the asset associated with an EPG. For instance, the data associated with the EPG may indicate a broadcast schedule of the specific media content. When the media storage service receives uploaded segments from the corresponding encoder at or near the scheduled time, the media storage service may classify the uploaded segments as segments of the specific media content. Once the media storage service identifies the uploaded segments specific to the media content, the media storage service may create a specific number of replicas of the media content based on the identified segments (block 415). As described above, the media storage service may receive the specific number information from a recording manager and record it in the asset for the specific media content. In some embodiments, the specific number may be determined prior to broadcast of the specific media content. In some embodiment, the media storage service may continuously monitor the status of the uploaded segments and existing replicas of the specific media content and store the information in the associated asset. For instance, the asset may include information indicating the storage locations of the uploaded segments and created replicas on the storage resource(s) of the media storage service.

Figure 5:
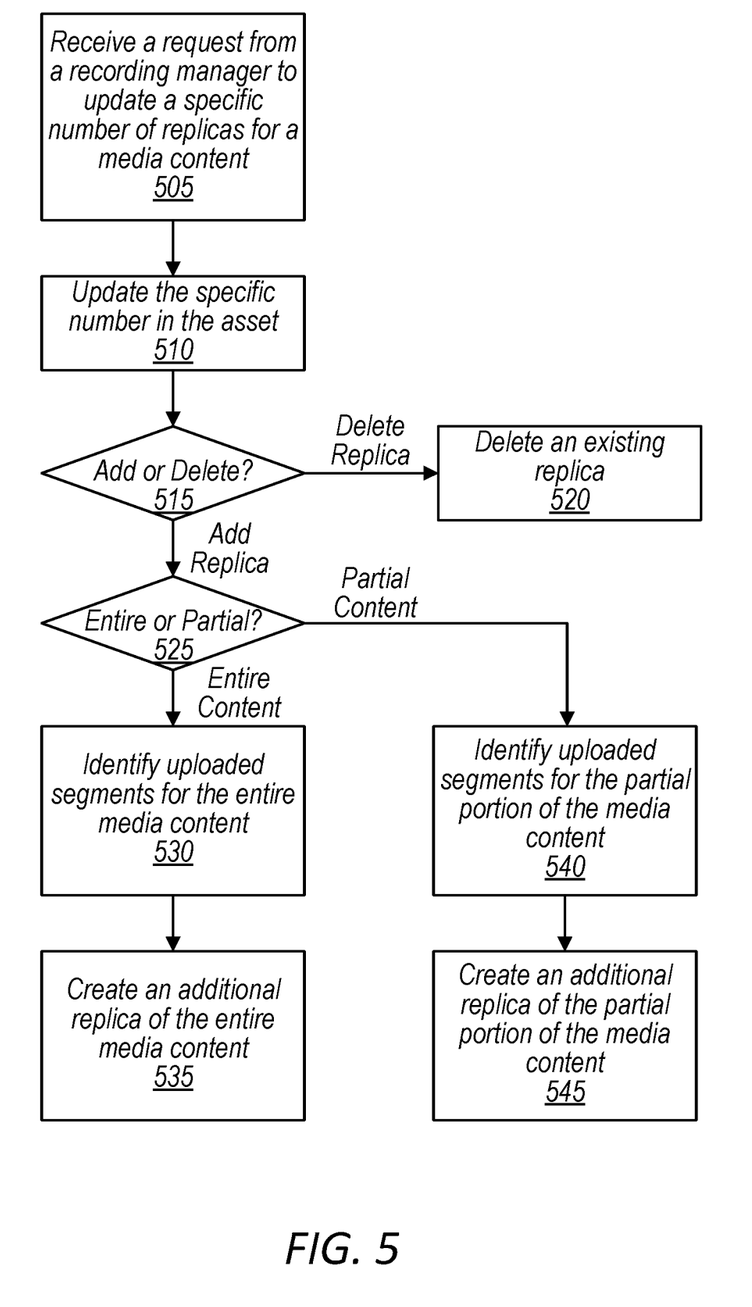
FIG. 5 is a block diagram showing an example of updating media content replicas in a media storage service, according to some embodiments.

FIG. 5 shows an example of updating media content replicas in a media storage service, according to some embodiments. In FIG. 5, the media storage service, such as media storage service 115/215 described above in FIGS. 1-2, may receive a request from a recording manager, such as recording managers 110/210 in FIGS. 1-2, to update a specific number of replicas for a media content stored on the storage resources of the media storage service (block 505). As described above, the updated recording request may be received by the recording manager from subscriber(s) during or post broadcast of the media content. In some embodiments, the request may indicate creating an additional copy of the media content. In some embodiments, the request may indicate deleting an existing coy of the media content. In response to the updated recording request from the recording manager, the media storage service may update the specific number of replicas for the media content in the asset specific to the media content (block 510). Accordingly, the media storage service may increase the specific number if the updated recording request is to create an additional copy, or reduce the specific number if the updated recording request is to delete an existing copy. As described above, it is now the media storage service that may be tasked to track the appropriate number of replicas to be maintained for the specific media content. The media storage service may further determine whether the updated specific number indicates adding or deleting replicas for the media content (block 515). For instance, the media storage service may compare the updated specific number versus the prior history to determine whether to create a new replica or remove an existing replica. When the media storage service determines that the updated recording request is to remove an existing replica, the media storage service may identify the replica from the existing copies that is specific to the client and then delete this identified replica (block 520). As described above, the media storage service may track the status of existing replicas, for instance, storing the path or storage location of the existing replicas in the asset specific to the media content. Thus, the media storage service may use the information in the asset to perform the identification of the existing replica specific to the client. Conversely, when the media storage service decides an updated request to create an additional replica for the specific media content, the media storage service may further evaluate whether the client is allowed to record the entire or partial portion of the media content (block 525). As described above, when the client request recording amid the broadcast, the client may or may not have access to a recording of the entire content, depending on service agreements between the subscriber and the content provider. When the client has the permission to record the entire content, the media storage service may identify uploaded segments for the entire media content (block 530) and create an additional replica of the media content based on the identified segments (block 535). As described above, the additional replica may include replicas of segments uploaded before and after the recording amid broadcast. Conversely, when the client is only allowed to record the media content after the mid-broadcast recording, the media storage service may identify uploaded segments for the allowed portion of the media content (block 540) and create an additional replica of the media content based on the identified segments (block 545). As described above, the asset associated with the media content may include timing information for the media content. The media storage service may base on the timing information in the asset to identify the appropriate segments for the partial portion of the media content. In some embodiments, the media storage service may retrieve segments from the uploaded segment within a time window (e.g., 10 seconds) prior to the allowance point and include replicas of the retrieved segments (within the time window) in the additional replica of the partial portion of the media content.

Figure 6:
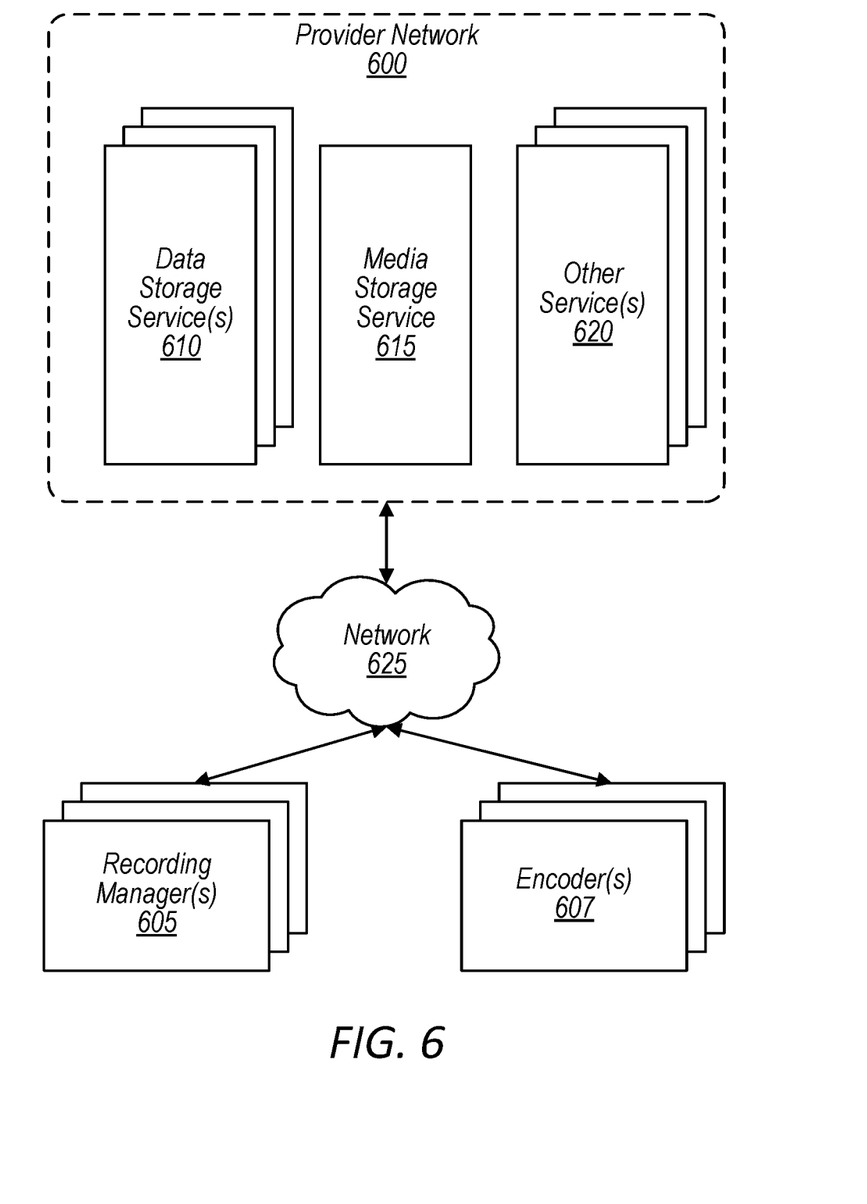
FIG. 6 is a block diagram showing an example provider network for providing media storage service as a network-based service, according to some embodiments.

FIG. 6 is a block diagram showing providing media storage service as a network-based service offered by a provider network service, according to some embodiments. In FIG. 6, provider network 600 may be a private or closed system or may be set up by an entity such as a company or a public sector organization to provide one or more services (such as various types of cloud-based storage) accessible via the Internet and/or other networks to one or more recording manager(s) 605 and one or more encoder(s) 607. Provider network 600 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and storage services offered by provider network 600. In some embodiments, provider network 600 may implement various computing resources or services, such as a data storage service(s) 610 (e.g., object storage services, block-based storage services, or data warehouse storage services), media storage service 615, as well as other service(s) 620, which may include a virtual compute service, data processing service(s) (e.g., map reduce, data flow, and/or other large scale data processing techniques), and/or any other type of network based services (which may include various other types of storage, processing, analysis, communication, event handling, visualization, and security services not illustrated).

Data storage service(s) 610 may implement different types of data stores for storing, accessing, and managing data on behalf of recording manager(s) 605 and encoder(s) 607 as a network-based service that enables one or more recording manager(s) 605 and encoder(s) 607 to operate a data storage system in a cloud or network computing environment. For example, data storage service(s) 610 may include various types of database storage services (both relational and non-relational) or data warehouses for storing, querying, and updating data. Such services may be enterprise-class database systems that are scalable and extensible. Queries may be directed to a database or data warehouse in data storage service(s) 610 that is distributed across multiple physical resources, and the database system may be scaled up or down on an as needed basis. The database system may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

Data storage service(s) 610 may also include various kinds of object or file data stores for putting, updating, and getting data objects or files, which may include data files of unknown file type. Such data storage service(s) 610 may be accessed via programmatic interfaces (e.g., APIs) or graphical user interfaces. Data storage service(s) 610 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

In some embodiments, media storage service 615 may be provided by provider network 600 as a network-based service to manage media recordings for cloud DVR systems. For instance, media storage system 615 may include a replicas manager (e.g., as replicas manager engine 235 described in FIG. 2) that create, store, access, maintain and manage assets and replicas for specific media contents. Media storage service 615 may receive segments of media contents from encoder(s) 607 through network 625 and store the segments on one or more storage resources of media storage service 615, data storage service(s) 610 or other service(s) 620. Media storage service 615 may also receive recording-related information from recording manager(s) 605, such as a specific number of replicas to be created and stored for a specific content. Media storage service 615 may create one or more assets for the media contents on the one or more storage resources of media storage service 615, data storage service(s) 610 or other service(s) 620, such as that one asset specific is associated with one specific media content. The assets may include information indicating respective media contents and specific numbers of replicas to be stored for the respective media contents. Based on the information included in the assets, media storage service 615 may identify the segments received from encoder(s) 607 as segments specific to the respective media contents. Media storage service 615 may create the specific numbers of replicas, based on the identified segments, for the respective media contents. In some embodiments, media storage service 615 may receive updated recording requests from recording manager(s) 605. The updated recording requests may indicate creating additional replica(s) or deleting existing replica(s) of a specific media content. Media storage service 615 may accordingly update the specific number in the asset specific to the media content. Based on the updated specific number, media storage service 615 may update existing replicas of the specific media content. In some embodiments, updating the existing replicas may include adding additional replica(s) or deleting existing replica(s). In some embodiments, as to create additional replica(s), media storage service 615 may determine whether the additional replica(s) include an entire or only a partial portion of the specific media content. Additional replica(s) of the entire content may include replicas of all the uploaded segments specific to the media content. Conversely, additional replica(s) of only a partial portion of the media content may include only replicas of the segments correspond to the partial portion of the content.

Other service(s) 620 may include various types of data processing services to perform different functions (e.g., anomaly detection, machine learning, querying, or any other type of data processing operation). For example, in at least some embodiments, data processing services may include a map reduce service that creates clusters of processing nodes that implement map reduce functionality over data stored in one of data storage service(s) 610. Various other distributed processing architectures and techniques may be implemented by data processing services (e.g., grid computing, sharding, distributed hashing, etc.). Note that in some embodiments, data processing operations may be implemented as part of data storage service(s) 610 (e.g., query engines processing requests for specified data).

Generally speaking, recording manager(s) 605 may encompass any type of media content recording devices and/or application, e.g., set-top boxes, streaming devices, smart TV, smart phones, tablets, computers, and encoder(s) 607 may any type of hardware and/or software to process source contents to create audiovisual outputs for broadcast and streaming delivery. Recording manager(s) 650 and encoder(s) 607 may be configurable to submit network-based requests to provider network 600 via network 625. In some embodiments, recording manager(s) 605 and encoder(s) 607 may include sufficient protocol support (e.g., for a suitable version of Hypertext Transfer Protocol (HTTP)) for generating and processing network-based services requests without necessarily implementing full browser support for all types of network-based data. That is, recording manager(s) 605 and encoder(s) 607 may be an application configured to interact directly with provider network 600. In some embodiments, recording manager(s) 605 and encoder(s) 607 may be configured to generate network-based services requests according to a Representational State Transfer (REST)-style network-based services architecture, a document- or message-based network-based services architecture, or another suitable network-based services architecture.

In various embodiments, network 625 may encompass any suitable combination of networking hardware and protocols necessary to establish network-based-based communications between client(s) 605 and provider network 600. For example, network 625 may generally encompass the various telecommunications networks and service providers that collectively implement the Internet. Network 625 may also include private networks such as local area networks (LANs) or wide area networks (WANs) as well as public or private wireless networks. For example, both a given client 605 and provider network 600 may be respectively provisioned within enterprises having their own internal networks. In such an embodiment, network 625 may include the hardware (e.g., modems, routers, switches, load balancers, proxy servers, etc.) and software (e.g., protocol stacks, accounting software, firewall/security software, etc.) necessary to establish a networking link between given client 605 and the Internet as well as between the Internet and provider network 600. It is noted that in some embodiments, client(s) 605 may communicate with provider network 600 using a private network rather than the public Internet.

Figure 7:
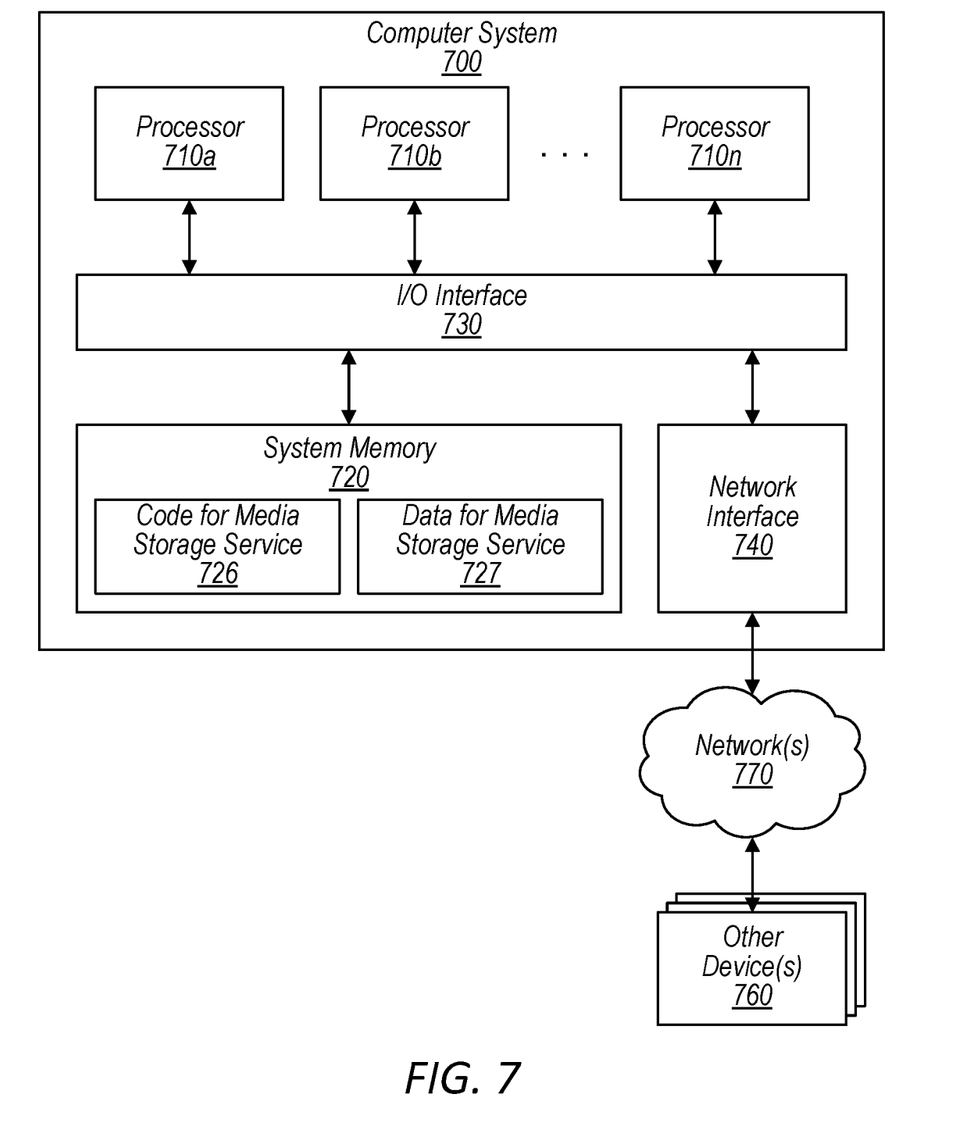
FIG. 7 is a block diagram showing an example computing system to implement the various techniques described herein, according to some embodiments.

FIG. 7 shows an example computing system to implement the various techniques described herein, according to some embodiments. In the illustrated embodiment, computer system 700 includes one or more processors 710 coupled to a system memory 720 via an input/output (I/O) interface 730. Computer system 700 further includes a network interface 740 coupled to I/O interface 730. While FIG. 7 shows computer system 700 as a single computing device, in various embodiments a computer system 700 may include one computing device or any number of computing devices configured to work together as a single computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be one embodiment of a computer-accessible medium configured to store instructions and data accessible by processor(s) 710. In various embodiments, system memory 720 may be implemented using any non-transitory storage media or memory media, such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740. In the illustrated embodiment, program instructions (e.g., code) and data implementing one or more desired functions, such as the media storage service described above in FIGS. 1-6, are shown stored within system memory 730 as code 726 and data 727.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices 760 attached to a network or networks 750. In various embodiments, network interface 740 may support communication via any suitable wired or wireless general data networks, such as types of Ethernet network, for example. Additionally, network interface 740 may support communication via telecommunications/telephony networks such as analog voice networks or digital fiber communications networks, via storage area networks such as Fiber Channel SANs, or via any other suitable type of network and/or protocol.

In some embodiments, system memory 720 may be one embodiment of a computer-accessible medium configured to store program instructions and data as described above for FIG. 1-6. Generally speaking, a computer-accessible medium may include non-transitory storage media or memory media such as magnetic or optical media, e.g., disk or DVD/CD coupled to computer system 700 via I/O interface 730. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, such as may be implemented via network interface 740.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices configured to implement a media storage service including a replicas manager, wherein the replicas manager is configured to:
receive a plurality of requests from a plurality of recording managers respectively associated with a group of subscribers to create assets, wherein each asset is associated with one media content specific to one group of subscribers, wherein each asset specifies the associated media content and a specific number of replicas to be stored by the media storage service for the associated media content, and wherein one replica of the associated media content is specific to one subscriber of the respective group of subscribers;
receive segments of a plurality of media contents from a plurality of encoders;
categorize segments from the received segments as segments specific to individual ones of the media contents based on the associated assets; and
store the specific number of replicas for the individual ones of the media contents on storage resources of the media storage service based on the segments specific to the individual media contents.

2. The system of claim 1, wherein the media storage service is further configured to:
receive another request to update the specific number of replicas specified by the asset for at least one media content; and
updating existing replicas of the at least one media content stored on the storage resources of the media storage service based on the updated specific number in the associated asset.

3. The system of claim 1, wherein at least one asset specifies a path on the storage resources of the media storage service to store received segments specific to the media content associated with the at least one asset, and wherein to categorize segments as segments specific to the associated media content comprises inspecting respective paths received with the received segments based on the path specified by the at least one asset.

4. The system of claim 1, wherein the media storage service is implemented as part of network-based services offered by a provider network, wherein the segments of the plurality of media contents from the plurality of encoders are received via a network-based interface for the media storage service, and wherein the replicas of the media contents and associated assets are stored in the storage resources that are implemented as part of the media storage service offered by the provider network.

5. A method, comprising:
creating, using a media storage service implemented by one or more computing devices, an asset wherein the asset includes information indicating a media content and a specific number of replicas of the media contents to be stored by the media storage service;
receiving one or more segments of a plurality of media contents, using the media storage service;
identifying, based on the asset, one or more segments from the received segments as segments specific to the indicated media content, using the media storage service; and
storing the specific number of replicas of the indicated media content on one or more storage resources in the media storage service, based on the identified one or more segments from the received segments.

6. The method of claim 5, wherein the asset includes information specifying a path on the one or more storage resources in the media storage service to store segments of the indicated media content, and wherein identifying the one or more segments as segments specific to the indicated media content comprises inspecting respective paths received with the received one or more segments based on the path specified by the information in the asset.

7. The method of claim 5, wherein the asset includes data associated with a manifest file or metadata for the indicated media content, and wherein identifying the one or more segments as segments specific to the indicated media content comprises inspecting the received one or more segments based on the data in the asset associated with the manifest file or metadata for the indicated media content.

8. The method of claim 5, wherein the asset includes data associated with a program guide for the indicated media content, and wherein identifying the one or more segments as segments specific to the indicated media content comprises inspecting the received one or more segments based on the data associated with the program guide.

9. The method of claim 5, further comprising:
receiving another request to update the specific number indicated in the asset; and
updating existing replicas of the indicated media content based on the updated specific number in the asset.

10. The method of claim 9, wherein updating the existing replicas comprises creating an additional replica or removing an existing replica of the indicated media content.

11. The method of claim 9, further comprising:
determining whether the other request indicates to create an additional replica of an entire or partial portion of the indicated media content;
responsive to determining that the other request indicates to create an additional replica of the entire portion of the indicated media content, creating the additional replica to include replicas of all the identified segments specific to the indicated media content; and
responsive to determining that the other request indicates to create an additional replica of a partial portion of the indicated media content,
determining a set of segments from the identified segments which correspond to the partial portion of the indicated media content based on timing information of the indicated media content included in the asset; and
creating the additional replica to include replicas of only the set of segments corresponding to the partial portion of the indicated media content.

12. The method of claim 5, wherein the media storage service is implemented as part of network-based services offered by a provider network, wherein the one or more segments of the plurality of assets are received via a network-based interface for the media storage service, and wherein the replicas of the media content and the asset are stored in the one or more storage resources that are implemented as part of the media storage service offered by the provider network.

13. One or more non-transitory computer readable media comprising instructions which, when executed on or across one or more computing devices, cause the one or more computing devices to:
create an asset wherein the asset includes information indicating a media content and a specific number of replicas of the media contents to be stored by the media storage service;
receive one or more segments of a plurality of media contents;
identify one or more segments from the received segments as segments specific to the indicated media content, using the media storage service; and
store the specific number of replicas of the indicated media content based on the identified one or more segments from the received segments.

14. The one or more non-transitory computer readable media of claim 13, wherein the asset includes information specifying a path on the one or more computing devices to store segments of the indicated media content, and wherein to identify the one or more segments as segments specific to the indicated media content comprises inspecting respective paths received with the received one or more segments based on the path specified by the information in the asset.

15. The one or more non-transitory computer readable media of claim 13, wherein the asset includes data associated with a manifest file or metadata for the indicated media content, and wherein to identify the one or more segments as segments specific to the indicated media content comprises inspecting the received one or more segments based on the data in the asset associated with the manifest file or metadata for the indicated media content.

16. The one or more non-transitory computer readable media of claim 13, wherein the asset includes data associated with a program guide for the indicated media content, and wherein to identify the one or more segments as segments specific to the indicated media content comprises inspecting the received one or more segments based on the data associated with the program guide.

17. The one or more non-transitory computer readable media of claim 13, further comprising instructions which, when executed on or across the one or more computing devices, cause the one or more computing devices to:
receive another request to update the specific number indicated in the asset; and
update existing replicas of the indicated media content based on the updated specific number in the asset.

18. The one or more non-transitory computer readable media of claim 17, wherein to update the existing replicas comprises creating an additional replica or removing an existing replica of the indicated media content.

19. The one or more non-transitory computer readable media of claim 17, further comprising instructions which, when executed on or across the one or more computing devices, cause the one or more computing devices to:
determine whether the other request indicates to create an additional replica of an entire or partial portion of the indicated media content;
responsive to determining that the other request indicates to create an additional replica of the entire portion of the indicated media content, create the additional replica to include replicas of all the identified segments specific to the indicated media content; and
responsive to determining that the other request indicates to create an additional replica of a partial portion of the indicated media content,
determine a set of segments from the identified segments which correspond to the partial portion of the indicated media content based on timing information of the indicated media content included in the asset; and
create the additional replica to include replicas of only the set of segments corresponding to the partial portion of the indicated media content.

20. The one or more non-transitory computer readable media of claim 13, wherein the create, receive, identify and store are implemented as part of a network-based media storage service offered by a provider network, wherein the one or more segments of the plurality of assets are received via a network-based interface for the media storage service, and wherein the replicas of the media content and the asset are stored in one or more storage resources that are implemented as part of the media storage service offered by the provider network.

* * * * *